United States Patent
Nguyen (10) Patent No.: US 8,090,892 B2
(45) Date of Patent: Jan. 3, 2012

(54) ORDERED QUEUE AND METHODS THEREFOR

(75) Inventor: Thang Q. Nguyen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 44 days.

(21) Appl. No.: 12/483,556

(22) Filed: Jun. 12, 2009

(65) Prior Publication Data

US 2010/0318716 A1 Dec. 16, 2010

(51) Int. Cl.
*G06F 13/36* (2006.01)

(52) U.S. Cl. ......... 710/310; 710/240; 710/200; 713/203

(58) Field of Classification Search .................. 710/310, 710/240–244, 200; 711/203
See application file for complete search history.

(56) References Cited

U.S. PATENT DOCUMENTS

| 5,535,345 | A | | 7/1996 | Fisch et al. | |
|---|---|---|---|---|---|
| 5,974,502 | A | * | 10/1999 | DeKoning et al. | 711/114 |
| 6,591,325 | B1 | * | 7/2003 | Akashi et al. | 710/305 |
| 6,628,294 | B1 | * | 9/2003 | Sadowsky et al. | 345/568 |
| 7,600,093 | B2 | * | 10/2009 | Ben-Yehuda et al. | 711/203 |
| 2008/0276240 | A1 | | 11/2008 | Ganesh et al. | |
| 2009/0216991 | A1 | * | 8/2009 | Hanscom | 711/203 |

* cited by examiner

Primary Examiner — Brian Misiura
Assistant Examiner — Kim T Huynh (57) ABSTRACT

A device receives a first request from a requesting device for first information that is stored at contiguous address locations beginning at a first address. A plurality of spawned requests are generated that each request a different portion of the first information. A table location is allocated to each one of the plurality of requests, wherein the relative location of each allocated table location is indicative of an order that the information from each spawned request is to be returned to the requesting device relative to the information from each other spawned request.

20 Claims, 8 Drawing Sheets

| ENTRY_LOC_# | VALID | BATON | READY | MERGE | LAST | TAG | SQ PTR | SIZE | OFFSET |
|---|---|---|---|---|---|---|---|---|---|
| 0 | | | | | | | | | |
| 1 | | | | | | | | | |
| ... | | | | | | | | | |
| 14 | | | | | | | | | |
| 15 | | | | | | | | | |

| ENTRY_LOC_# | VALID | BATON | READY | MERGE | LAST | TAG | SQ PTR | SIZE |
|---|---|---|---|---|---|---|---|---|
| 0 (A0) | 1 | 1 | 0 | 0 | 0 | 0 | 6 | 1 |
| 1 (A1) | 1 | 0 | 0 | 1 | 0 | 1 | 6 | 2 |
| 2 (A2) | 1 | 0 | 0 | 0 | 1 | 2 | 6 | 120 |
| 3 (B0) | 1 | 1 | 0 | 0 | 0 | 3 | 7 | 256 |
| 4 (B1) | 1 | 0 | 0 | 0 | 1 | 4 | 7 | 256 |
| 5-15 | 0 | X | X | X | X | X | X | X |

FIG. 6
600

| ENTRY_LOC_# | VALID | BATON | READY | MERGE | LAST | TAG | SQ PTR | SIZE |
|---|---|---|---|---|---|---|---|---|
| 0 (A1) | 1 | 1 | 0 | 1 | 0 | 1 | 6 | 2 |
| 1 (A2) | 1 | 0 | 0 | 0 | 1 | 2 | 6 | 120 |
| 2 (B0) | 1 | 1 | 0 | 0 | 0 | 3 | 7 | 256 |
| 3 (B1) | 1 | 0 | 0 | 0 | 1 | 4 | 7 | 256 |
| 4-15 | 0 | X | X | X | X | X | X | X |

| ENTRY_LOC_# | VALID | BATON | READY | MERGE | LAST | TAG | SQ PTR | SIZE |
|---|---|---|---|---|---|---|---|---|
| 0 (A2) | 1 | 1 | 0 | 0 | 1 | 2 | 6 | 120 |
| 1 (B0) | 1 | 1 | 0 | 0 | 0 | 3 | 7 | 256 |
| 2 (B1) | 1 | 0 | 0 | 0 | 1 | 4 | 7 | 256 |
| 3-15 | 0 | X | X | X | X | X | X | X |

| ENTRY_LOC_# | VALID | BATON | READY | MERGE | LAST | TAG | SQ PTR | SIZE |
|---|---|---|---|---|---|---|---|---|
| 0 (A2) | 1 | 1 | 0 | 0 | 1 | 2 | 6 | 120 |
| 1 (B0) | 1 | 1 | 0 | 0 | 0 | 3 | 7 | 256 |
| 2 (B1) | 1 | 0 | 1 | 0 | 1 | 4 | 7 | 256 |
| 3-15 | 0 | X | X | X | X | X | X | X |

| ENTRY_LOC_# | VALID | BATON | READY | MERGE | LAST | TAG | SQ PTR | SIZE |
|---|---|---|---|---|---|---|---|---|
| 0 (A2) | 1 | 1 | 0 | 0 | 1 | 2 | 6 | 120 |
| 1 (B1) | 1 | 1 | 1 | 0 | 1 | 4 | 7 | 256 |
| 3-15 | 0 | X | X | X | X | X | X | X |

| ENTRY_LOC_# | VALID | BATON | READY | MERGE | LAST | TAG | SQ PTR | SIZE |
|---|---|---|---|---|---|---|---|---|
| 0 (A2) | 1 | 1 | 0 | 0 | 1 | 2 | 6 | 120 |
| 3-15 | 0 | X | X | X | X | X | X | X |

| ENTRY_LOC_# | VALID | BATON | READY | MERGE | LAST | TAG | SQ PTR | SIZE |
|---|---|---|---|---|---|---|---|---|
| 0 (N/A) | 0 | X | X | X | X | X | X | X |
| 1 (A0) | 1 | 1 | 0 | 0 | 0 | 0 | 6 | 1 |
| 2 (A1) | 1 | 0 | 0 | 1 | 0 | 1 | 6 | 2 |
| 3 (B0) | 1 | 1 | 0 | 0 | 0 | 3 | 7 | 256 |
| 4 (N/A) | 0 | X | X | X | X | X | X | X |
| 5 (A2) | 1 | 0 | 0 | 0 | 1 | 2 | 6 | 120 |
| 6 (N/A) | 0 | X | X | X | X | X | X | X |
| 7 (B1) | 1 | 0 | 0 | 0 | 1 | 4 | 7 | 256 |
| 8-15 | 0 | X | X | X | X | X | X | X |

FIG. 11

ORDERED QUEUE AND METHODS THEREFOR

BACKGROUND

1. Field of the Disclosure

The present disclosure relates generally to data processing devices and methods, and more particularly to the processing of information requests.

2. Description of the Related Art

A data processing device can include one or more peripheral interconnect devices to support the exchange of information with other data processing devices. To facilitate interoperability of data processing devices, manufacturers of data processing devices conventionally implement industry-standard interconnect technologies and associated protocols. One example of an industry-standard interconnect technology is the Peripheral Component Interconnect Express (PCI-Express or PCI-E) standard. PCI-E is used in consumer, server, and industrial applications; both as a motherboard-level interconnect to link motherboard-mounted peripherals, and as an expansion card interface for add-on peripheral device hardware. PCI-E devices communicate via a logical connection called a link. A link is a point-to-point communications channel between two PCI-E ports, allowing both ports to send/receive PCI-requests and interrupts. PCI-E channel is a serial interface that supports one or more lanes, wherein each lane includes a separate transmit-pair and receive-pair of serial lines. Each lane supports full duplex transport of packetized information.

PCI-E is a layered protocol, consisting of a transaction layer, a data link layer, and a physical layer. PCI-E implements split transactions (transactions with request and response separated by time), thereby allowing the link to carry other traffic while the target device gathers data for a response. The data link layer implements the sequencing of transaction layer packets that are generated by the transaction layer. The PCI-E protocol includes error detection/correction using cyclic redundancy checks, receipt acknowledgement, and other restrictions, such as rules governing out-of-order completion of transactions.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A PCI-E controller can receive a single read-transaction from a PCI-E peripheral device over a link, and the controller can fragment the transaction into multiple spawned requests that are directed towards one or more storage locations of an associated data processing device that store the requested information. The PCI-E controller returns the requested information associated with a particular PCI-E transaction to the requester in increasing-address order, even though the individual spawned requests may be satisfied in an out-of-order manner. A mechanism to track spawned requests that originate from a single PCI-E read transaction and return the requested information to the original requestor in increasing-address order is disclosed in accordance with specific embodiments of the present disclosure. Furthermore, multiple read-transactions requests received at the PCI-E device over a link can be returned to the original requester over the link in an out-of-order manner.

Figure 1:
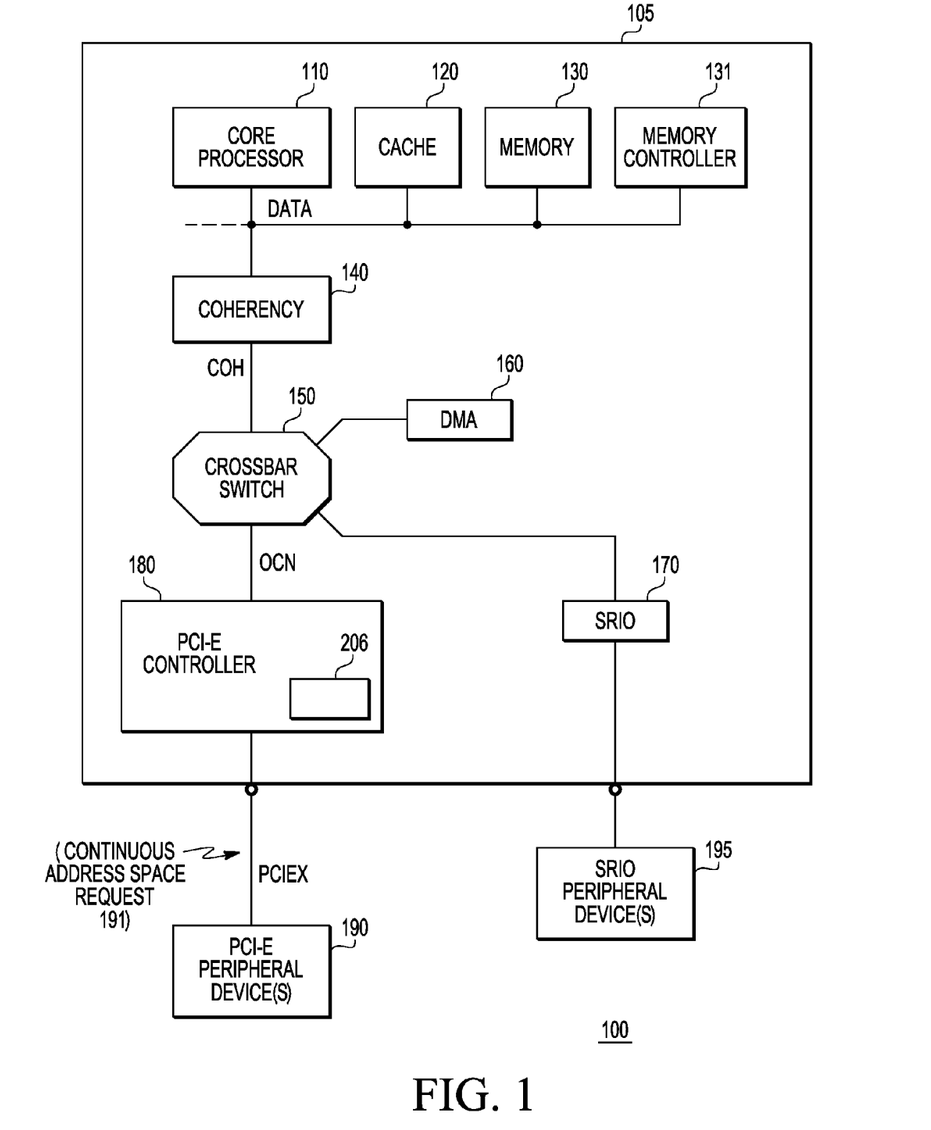
FIG. 1 is a block diagram illustrating a device including a data processing device, which includes a PCI-E compliant peripheral interconnect device in accordance with a specific embodiment of the present disclosure.

FIG. 1 is a block diagram illustrating a device 100 including a data processing device 105 that can be part of an integrated circuit. The device 105 includes a PCI-E compliant peripheral interconnect device, e.g., PCI-E controller 180, in accordance with a specific embodiment of the present disclosure. Data processing device 105 further includes a core processor 110, a cache module 120, a memory module 130, a coherency module 140, a crossbar switch 150, a direct memory access (DMA) controller 160, and a serial rapid input/output bus (SRIO) controller 170. PCI-E controller 180 includes an inbound portion 206 that handles incoming PCE-E requests. Data processing device 105 represents a computational device such as a microprocessor, a microcomputer, an embedded processor, and the like. Device 100 also includes a PCI-E peripheral device 190 connected to PCI-E controller 180 via a PCI-E bus, and a SRIO peripheral device 195 connected to SRIO controller 170 via a SRIO bus.

Core processor 110 has a central processing unit operable to execute instructions and manipulate information. Data processing device 105 can include more than one core processor, and computations performed by data processing device 105 can be distributed amongst one or more of these core processors. Core processor 110 is connected to cache module 120, memory module 130, and coherency module 140 via a data bus labeled "DATA." Memory module 130 is configured to store information that can be accessed and manipulated by core processor 110, DMA 160, coherency module 140, and other modules. Other memory modules (not illustrated) can be external to data processing device 105 and accessed via a memory controller 131, which can include a double data rate (DDR) memory interface or other type of memory interface. Cache module 120 can store information, such as a copy of information stored at memory module 130 or from a memory external device 105, and generally can be accessed by core processor 110 more efficiently than from other memories. In an embodiment, information is exchanged via the data bus in blocks of a fixed size that correspond to a single cache-line accessed from cache module 120, or a minimum-size single access from memory module 130. Coherency module maintains consistency between common information stored at cache module 120 and memory module 130.

Coherency module 140 is connected to crossbar switch 150 via a bus labeled "COH." Information can be exchanged via bus COH in increments as small as a single byte. Crossbar switch 150 is configured to connect multiple inputs to multiple outputs in a matrix manner. Crossbar switch 150 is connected to DMA controller 160, SRIO controller 170, and to PCI-E controller 180 via a bus labeled "OCN." DMA controller 160 is configured to support certain hardware subsystems within data processor 105 to access memory resources independently of core processor 110. SRIO controller 170 provides a high-speed interface between data processing device 105 and an external peripheral device. SRIO controller 170 is another peripheral communications device operable to support high-speed communications between data processing device 105 and a similar controller at one or more peripheral devices, such as SRIO Peripheral device 195. Additional devices (not shown) can be connected to crossbar switch 150.

PCI-E controller 180 is configured to provide an interface between data processing device 105 and PCI-E peripheral device 190, including through inbound portion 206. PCI-E peripheral device 190 is associated with another device, such as a microprocessor, a graphics adapter, a memory device, or the like, via a bus labeled "PCIEX." Additional PCI-E peripheral devices (not shown) can be connected to bus PCIEX through a switching interface (not shown). The interface provided by PCI-E controller 180 is compliant with an industry-standard interface known as PCI Express. PCI-E controller 180 includes an inbound portion 206, which is configured to implement various aspects of the presently disclosed techniques in conjunction with other modules included at PCI-E controller 180.

A PCI-E transaction can include a read or write transaction initiated by data processing device 105, which is directed at information storage locations at or accessible by an external data processing device such as PCI-E peripheral device 190. A PCI-E transaction can also include a read or write transaction initiated by an external data processing device, which is directed at information storage locations at or accessible by data processing device 105. For example, PCI-E peripheral device 190 may initiate a PCI-E read transaction, e.g., a request for information, via bus PCIEX. PCI-E controller 180 responds by accessing the requested information from one or more memory locations, and providing the requested information back to PCI-E peripheral device 190 via bus PCIEX. The requested information may be stored at a location local to data processing device 105, such as memory module 130 and cache module 120, or may be stored at a location external to data processing device 105 but accessible by data processing device 105, such as at another peripheral device connected via SRIO controller 170 or at an external memory, or at a combination of locations. In addition, the requested information can be stored at both local and external locations. For clarity, PCI-E transactions are described from the point of view of PCI-E peripheral device 190. For example, a read transaction is a request initiated by PCI-E peripheral device 190 and directed at data processing device 105.

Figure 2:
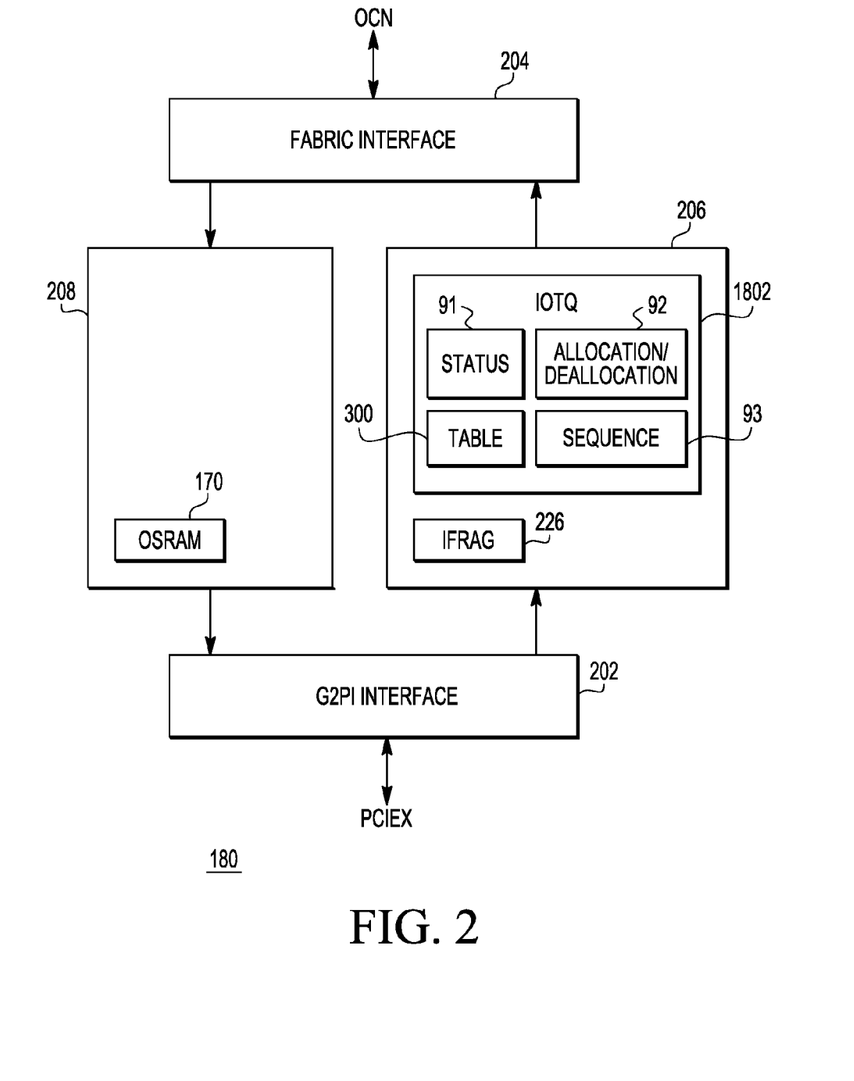
FIG. 2 is a block diagram illustrating the PCI-E controller of FIG. 1 in accordance with a specific embodiment of the present disclosure.

FIG. 2 is a block diagram illustrating PCI-E controller 180 of FIG. 1 in accordance with a specific embodiment of the present disclosure. PCI-E controller 180 includes a generic bus interface module (G2PI INTERFACE 202), a fabric interface module 204, an inbound portion 206, and an outbound portion 208. Inbound portion 206 includes a module labeled IOTQ 1802 and a module labeled IFRAG 226, and output portion 208 includes a module labeled OSRAM 170. IOTQ 1802 includes a status module 91, allocation/de-allocation module 92, a sequence module 93, and a table 300. G2PI interface module 202 is connected to bus PCIEX, and has an output connected to inbound portion 206 and an input connected to outbound portion 208. Fabric interface module 204 is connected to bus OCN, and has an input connected to inbound portion 206 and an output connected to outbound portion 208.

During operation, a PCI-E read transaction initiated by PCI-E peripheral device 190 that requests a set of information at a contiguous address space, e.g., a contiguous address space request 191, is received at inbound portion 206 via G2PI interface module 202. The request from device 190 may be split (fragmented) to generate multiple requests by IFRAG module 226 that together request the same set of information as the received read transaction. For example, a single PCI-E read transaction from device 190 requesting one kilobyte of information may be fragmented into four separate requests that each request 256 bytes of information. Each separate request is referred to as a spawned request, whereby the amount of information requested by a spawned request can be based on operational characteristics of data processing device 105.

Spawned requests resulting from a fragmented PCI-E read transaction initiated by PCI-E peripheral device 190 are provided to crossbar switch 150, which targets memory module 130, external memory via memory controller 131, cache module 120, or other input/output devices such as SRIO 170, and the like. Depending on the latency of each target, responses to the spawned requests associated with a single request from PCI-E peripheral device 190 can be returned to PCI-E controller 180 out-of-order relative to increasing address order of the requested address space. For example, if a single read transaction is fragmented into several spawned requests, and some of the spawned requests are hitting at cache module 120 and some are retrieved from memory module 130, information associated with a higher address space of the requested memory can be received from cache module 120 before information associated with a lower address space of the requested space of the requested memory is received from memory module 130. Other situations can also cause out-of-order responses to requests. For example, when requested information is still stored in a local target queue, this information can be returned earlier than results associated with other spawned requests. When a spawned request is directed to another external PCI-E peripheral device, referred to as a bridging access, requested information can be returned later than results associated with other spawned requests.

An entry is generated at a table 300 stored at module IOTQ 1802 for each spawned request generated by module IFRAG 226 and for each direct request from PCI-E peripheral device 190 that does not result in spawned request being accessed. Information stored at IOTQ 1802 is used by PCI-E controller 180 to facilitate compliance with PCI-E protocols. In particular, IOTQ 1802 is configured to manage spawned requests and the processing of retrieved information associated with each spawned request. Inbound portion 206 initiates spawned access requests via fabric interface module 204 for servicing by data processing device 105, which returns the requested information via fabric interface module 204 to the outbound portion 208 where the information is temporarily stored at OSRAM 170. Data processing device 105 may return requested information to the fabric interface 204 in a different order than the corresponding spawned requests were dispatched at the fabric interface 204. The requested information is provided from the outgoing portion 208 to PCI-E peripheral device 190 via G2PI interface module 202 based on information maintained and manipulated at IOTQ 1802. Providing information back to the requesting device in response to a request submitted to the OCN bus, such as a spawned request, is referred to as a completion. In the event that a single PCI-E read transaction from PCI-E peripheral device 190 is fragmented into multiple spawned requests, the requested information can be provided to the requesting device in multiple separate portions, each portion corresponding to a completion. Completions must be returned to the requesting device in an increasing-address order.

Figure 3:
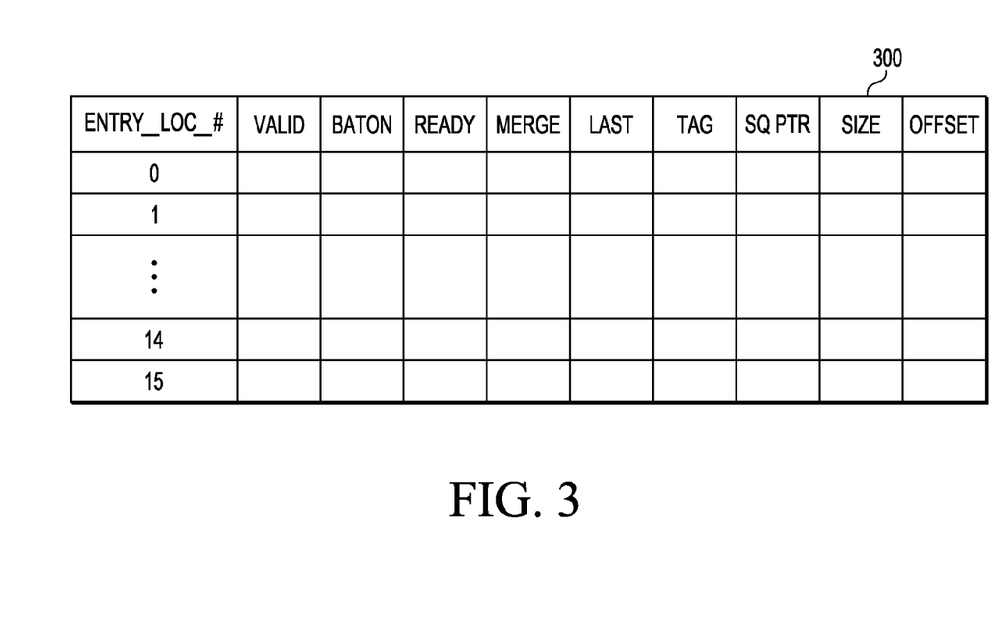
FIG. 3 is a block diagram illustrating a table included at the inbound ordered tag queue of FIG. 2 in accordance with a specific embodiment of the present disclosure.

FIG. 3 is a block diagram illustrating a table 300 included at module IOTQ 1802 of FIG. 2 in accordance with a specific embodiment of the present disclosure. Table 300 includes sixteen contiguous entry locations, e.g., accessed by contiguous addresses, numbered from zero to fifteen (ENTRY_LOC_0-ENTRY_LOC_15). Each entry location of table 300 has a fixed location relative to each other entry location, and ENTRY 0 can be referred to as the top entry location. Each entry location includes nine information fields, represented by information fields labeled "VALID," "BATON," "READY," "MERGE," "LAST," "TAG," "SQ PTR," "SIZE," and "OFFSET." IOTQ 1802, and table 300 in particular, is configured to keep track of the status of PCI-E transactions, manage in-order and out-of-order responses associated with spawned requests issued to data processing device 105, and to facilitate providing completions to the requesting source, e.g., PCI-E peripheral 190.

Table 300 can be implemented as a collapsible queue, wherein all valid entries are maintained at the entry locations nearest the top of the queue, e.g., only one empty entry location is contiguous to an allocated entry location, e.g. a valid entry, at a time. For example, if there are no outstanding requests because all previous PCI-E read transactions have been completed, all sixteen entry locations at table 300 are empty. However, when a PCI-E read transaction is received and fragmented into three spawned requests, the first three entry locations (ENTRY 0 through ENTRY 2) at table 300 are allocated—each entry corresponding to one spawned request. Contiguous entry locations are allocated to spawned requests in an order that is based on increasing-address values of the requested information associated with the spawned request relative to each other related spawned request. When the requested information associated with an entry location is retrieved and provided to the requesting source (a completion), the entry is de-allocated and all entries stored at entry locations below the deleted entry location are shifted up, e.g. toward the first entry location 310, so that all entry locations containing information are once again contiguous within the table. See for example, the table of FIG. 6 where all entries are shifted up one in response to the first entry associated with request A0 being de-allocated, as will be discussed in greater detail herein. Thus, all entry locations that are empty, e.g., not allocated, are sequential and contiguous to each other and are located further away from the first entry location than any entry location that is populated, e.g., valid. Information corresponding to a new spawned request is stored at the first entry location following the allocated entry locations. An address of the memory being accessed by each request is not stored at table 300 and is not required to provide completions to PCI-E peripheral device 190 in an address-increasing order.

The field VALID of each entry location can be a single memory bit and is referred to as a valid bit. The valid bit is asserted when the entry location is allocated, e.g., the entry location is associated with a request for information that has not yet been received. The field BATON of each allocated entry location can include a single memory bit, and is referred to as a baton bit. When a PCI-E transaction is fragmented into multiple spawned requests represented by multiple entries at table 300, the baton bit associated with the top-most entry of the fragmented request, e.g., for each set of multiple spawned requests the entry that is nearest to the top of table 300 is asserted. An asserted baton bit indicates that the request associated with this entry is accessing a portion (fragment) of the information requested by PCI-E controller 180 that is to be returned to the requesting source before any other portion (fragment) of the requested information from any other pending spawned requests. This ensures that the information requested by the requesting source that is at the lowest address space is returned prior to information at higher address spaces. Therefore, baton bits associated with the remaining spawned requests of the original request from PCI-E controller 190 are negated.

A baton is said to be passed when the baton bit is asserted at a subsequent entry location that is associated with a spawned request accessing the information at the next lowest address space. The baton is passed to a subsequent entry from a present entry when the current entry is de-allocated in response to a corresponding completion, or data is being merged as described below. Therefore, a completion corresponding to a spawned request cannot occur unless the baton bit of the spawned request's associated entry is asserted.

The field LAST of each allocated entry location can include a single memory bit and is referred to as a last bit. The last bit is asserted at an entry associated with the last spawned request of a fragmented PCI-E transaction, which is the entry location farthest from the top of table 300. For example, if a single PCI-E transaction is fragmented into spawned requests A0, A1, and A2, the baton bit associated with spawned request A0 and the last bit associated with spawned request A2 are asserted during initialization.

Each request spawned from a single PCI-E read transaction receives the same static queue pointer value, stored at field SQ PTR, which is unique to that PCI-E transaction. Because a common SQ PTR between entry locations indicates spawned transactions are associated with a common source request, a baton can only be passed to an entry with the same SQ PTR value. Note that it is possible for a baton bit and a last bit to both be asserted at an entry associated with a single request when the request is associated with a PCI-E transaction that is not fragmented.

The field READY of each allocated entry location can include a single memory bit and is referred to as a ready bit. The ready bit is asserted at a respective entry of table 300 when a response corresponding to a request at table 300 is returned via outbound portion 208 via fabric interface module 204. The respective entry is identified by matching the value stored at its TAG field to the tag of the returned request.

The field MERGE of each allocated entry location includes a single bit and is referred to as a merge bit. The merge bit is asserted to indicate that requested information associated with an entry is to be merged with requested information associated with the next entry location associated with the same fragmented transaction. Both entries will specify the same location at OSRAM 170 where the successive results are merged. The merge bit is generally used in association with spawned requests that access less than eight bytes.

The field OFFSET is used to store a byte offset value indicating the location at OSRAM 170 that a particular request result is to be stored. The field SIZE is used to store an indication of the size, in bits, of the access associated with a corresponding entry at table 300.

The field SQ PTR is used to store a value identifying the originating PCI-E read transaction. A group of spawned requests associated with a single PCI-E read transaction are assigned the same SQ PTR value. The field TAG is used to store a four-bit tag value that uniquely identifies the associated request or spawned request. A completion packet will return the requested data in addition to tag information that identifies the PCI-E read transaction.

Figure 4:
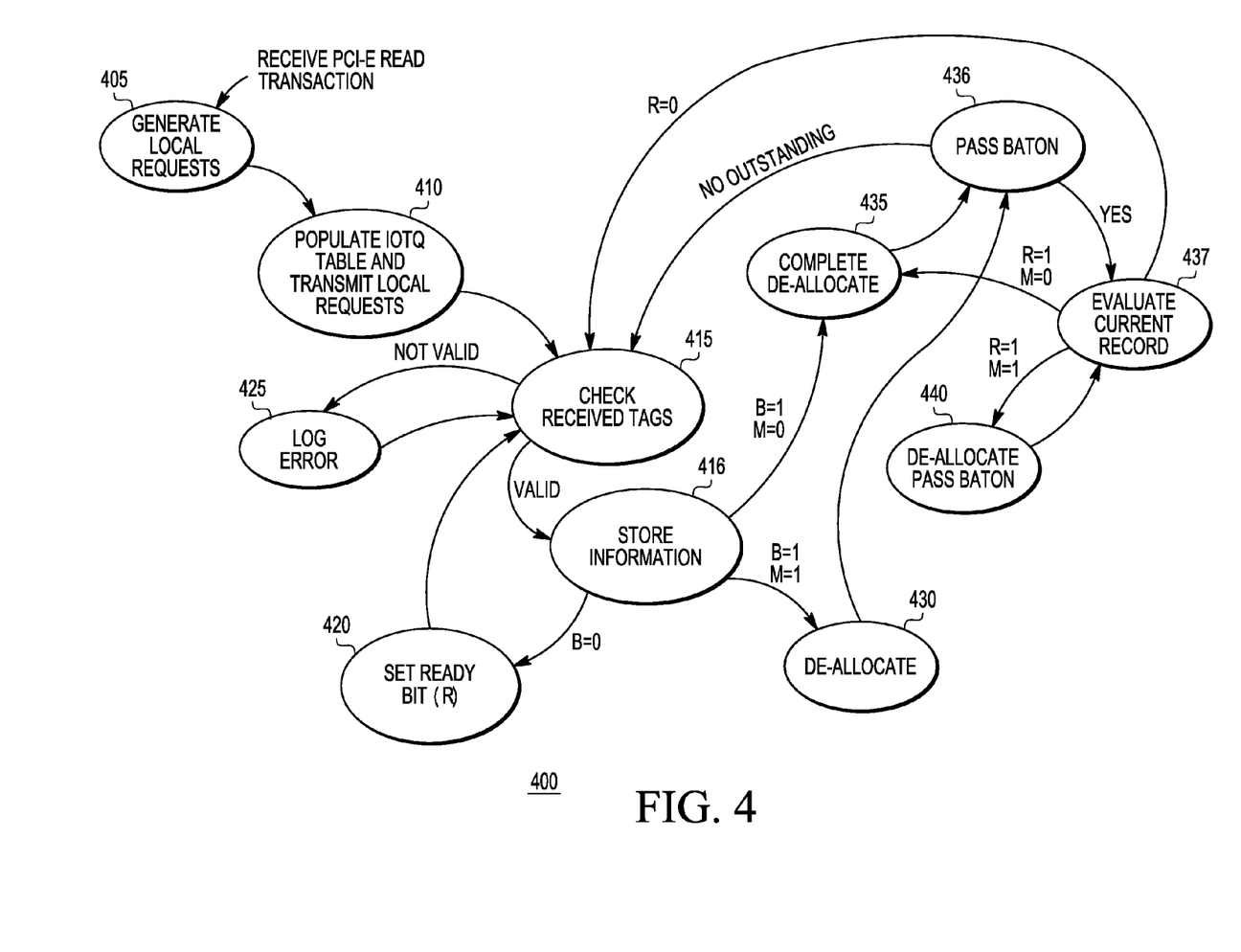
FIG. 4 is a state diagram illustrating the operation of the inbound ordered tag queue of FIG. 2 in accordance with a specific embodiment of the present disclosure.

FIG. 4 is a state diagram 400 illustrating the general operation of the PCI-E controller 180, and particularly the operation of IOTQ 1802, of FIG. 2 in accordance with a specific embodiment of the present disclosure. State diagram 400 begins at state 405 following receipt of a source request, e.g., a PCI-E read transaction from PCI-E peripheral device 190. As discussed previously, the source request identifies contiguous address space where the requested information is stored. At state 405, one or more requests are generated to be provided by fabric interface 204 to the bus OCN to access the information requested by the PCI-E transaction. If the source request was not fragmented, e.g., the information requested by the source can be accessed by a single internal request to bus OCN, a single request will be generated. Alternatively, multiple spawned requests can be generated by module IFRAG 226 to access the information requested by the source. The flow proceeds to state 410 after the local requests have been generated at state 405.

At state 410, entry locations at table 300 of IOTQ 1802 are allocated by allocation/de-allocation module 92 to generate entries that correspond to the requests generated at state 405, which are to be provided to the fabric interface 204. The allocated entry locations are populated by status module 91 of IOTQ 1802, which populates various fields of the corresponding records with initial values as described with reference to FIG. 3, and the generated requests are transmitted via fabric interface 204 to bus OCN. Note that while spawned requests associated with a common source request must be returned to the requesting device in ascending address order, they can be transmitted to the bus OCN in any order. The flow proceeds to state 415 after the generated requests have been transmitted via the fabric interface 204.

At state 415, each response that is returned via the fabric interface 204, referred to as a current response, has its tag checked to determine if it matches a tag of a valid entry at table 300. If the tag of a current response does not match a tag at table 300, the flow proceeds to state 425. If the tag of a current response matches a valid entry at table 300, the flow proceeds to state 416.

The flow proceeds from state 415 to state 425 in response to a valid entry not being found at table 300 for a current response, e.g., a valid entry at table 300 having the same tag as the tag of the current response was not found. At state 425 an error is logged and the flow returns to state 415 to wait for receipt of further responses.

The flow proceeds from state 415 to state 416 in response to a valid entry being found at table 300 for the current response, e.g., a valid entry at table 300 having the same tag as the tag of the current response was found. At state 416 the information being returned by the current response for the source request is stored at OSRAM 170. If the current response has its corresponding baton bit negated (B=0) at table 300, the flow proceeds to state 420. If the returned response has its corresponding baton bit asserted (B=1) and its merge bit asserted (M=1) at table 300, the flow proceeds to state 430. If the current response has its corresponding baton bit asserted (B=1) and its merge bit negated (M=0) at table 300, the flow proceeds to state 435.

The flow proceeding from state 416 to 420, in response to the baton bit corresponding to the current response being negated, is an indication that the information being returned by the current response is not to be provided to the requesting source at this time because there is other information associated with the same source request that needs to be provided to the requesting source prior to the information from the current response. For example, the current response is associated with a spawned request that is returning a portion of the address space requested by the source device that is at a higher address in the requested address space than a different portion of the address space requested by a different spawned request that has not yet been returned. At state 420, the ready bit is asserted at the entry of table 300 that corresponds to the current response, thereby indicating that the information associated with this entry has been received, and flow returns to state 415 to wait for receipt of further responses.

The flow proceeds from state 415 to 430 in response to a current entry having its corresponding baton bit asserted (B=1) and its merge bit asserted (M=1). The asserted merge bit indicates that the information returned by the current response is not to be provided to the source at this time because it is to be provided to the requesting source consecutively with other information associated with another spawned request. At state 430, the entry associated with the returned request is de-allocated and flow proceeds to state 436. Note that information associated with a record having its merge bit asserted is stored at a location of OSRAM 170 that will have its contents transmitted to the requesting source along with other information when a response associated with a subsequent entry is completed.

The flow proceeding from state 416 to state 435 in response to the current entry having its corresponding baton bit asserted (B=1) and its merge bit negated (M=0), is an indication that the information returned with the current request, which is stored at OSRAM 170, is ready to be transmitted to the requesting source (a completion) via the outbound interface 202. Therefore, at state 435 the information associated with the current response is transmitted to the requesting source, the entry at table 300 corresponding to the current response is de-allocated by the allocation/de-allocation module 92, and the flow proceeds to state 436. Note that information associated with previous responses that is to be merged with the current response will also be transmitted to the requesting device in a consecutive order as indicated by increasing address space identified by the requesting device.

At state 436 the baton is passed to a next entry of table 300 corresponding to the next spawned request associated with the same requesting source transaction, if any. As described with reference to table 300 above, this will be the next entry in sequence having the same value at field SQ PTR as the now de-allocated entry for the current request. If there is no outstanding spawned request associated with the current request, no baton bit is asserted at table 300 and the flow proceeds to state 415 to wait receipt of further responses. If the baton bit was passed, the flow proceeds to state 437.

At state 437, the record to which the baton bit was passed, the current record, is evaluated. If the current record has its corresponding ready bit negated (R=0) it is an indication that no information corresponding to this record has been received and flow returns to state 415 to wait for further responses. If the current record has its corresponding ready bit asserted (R=1) and its match bit negated (M=0) it is an indication that the information associated with the current record was previously received and is ready to be transmitted, and the flow returns to state 435 where the merged information is returned (a completion), and the record is de-allocated. If the current record has its corresponding ready bit asserted (R=1) and its match bit asserted (M=1) it is an indication that the information associated with this record was previously received and is to be merged with other information, and flow returns to state 440.

The flow proceeding to state 440 is an indication that the information associated with the current record was previously received and is to be merged with information associated with a subsequent record. Therefore, no information is to be transmitted at this time, the current record is de-allocated, and the baton is passed to identify a new current record. The flow returns to state 437 from state 440.

FIGS. 5-10 are diagrams illustrating information stored at table 300 of FIG. 3 at incremental stages of execution of two read transactions, e.g., requests, received from PCI-E peripheral device 190 in accordance with a specific embodiment of the present disclosure.

Figure 5:
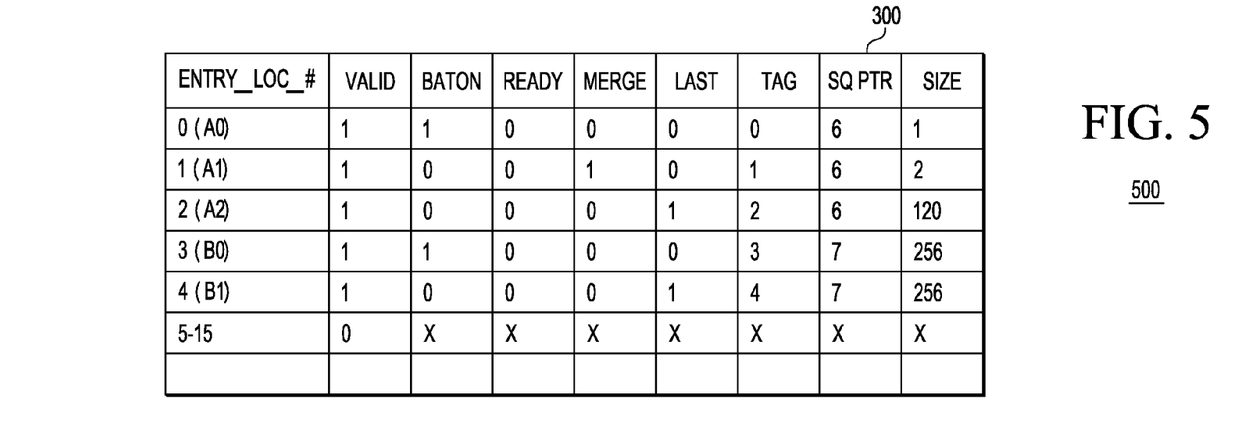
FIGS. 5-10 are block diagrams illustrating information stored at the table included at the inbound ordered tag queue of FIG. 2 at incremental stages of execution of two read transactions received from the PCI-E peripheral device of FIG. 1 in accordance with a specific embodiment of the present disclosure.

FIG. 5 illustrates table 300 in a state 500 following the receipt of two PCI-E read transactions from PCI-E peripheral device 190 (the requesting source). The first of the two read transactions is fragmented into three spawned requests, labeled "A0," "A1," and "A2" that are outstanding, and the second transaction is fragmented into two spawned requests labeled "B0," and "B1" that are outstanding. Table 300 includes entry locations ENTRY_LOC_0-ENTRY_LOC_15 that represent sixteen entry locations. Each entry location includes nine information fields that are used to represent the status of a specific outstanding request. The information fields include VALID, BATON, RDY, MERGE, LAST, TAG, SQ PTR, and SIZE.

During initialization at state 500, status module 91 asserts the valid bit for each of the five entry locations ENTRY_LOC_0-ENTRY_LOC_4 that correspond to the outstanding requests A0-A3, B0, and B1, to indicate that requests associated with these entries have not yet been completed. The valid bit is negated at entry locations ENTRY_LOC_5-ENTRY_LOC_15 indicating that no outstanding requests are associated with these entries. A tag value that is unique is stored at the TAG field of each entry, whereby no two entries have the same tag value. A SQ PTR value that is unique is stored at the SQ PTR of entries associated with the same PCI-E read transaction (source request), whereby each of the spawned request associated with the same source request have the same SQ PTR value. For example, the entries associated with spawned requests A0-A2 have a SQ_PTR value of 6, and the entries associated with spawned requests B0-B1 have a SQ_PTR value of 7. The baton bit is asserted at the entry associated with spawned request A0 to indicate that information returned from spawned request A0 is to be returned to the requesting source prior to information from any other related spawned requests, e.g., spawned requests A1 and A2. The baton bit is asserted at the entry associated with spawned request B0 to indicate that information returned from spawned request B0 is to be returned to the requesting source prior to information from any other related spawned requests, e.g., spawned requests B1. The last bits at ENTRY_LOC_2 and ENTRY_LOC_4 have been asserted at entry locations corresponding to the last spawned request of each PCI-E read transaction, e.g., A2 and B1. The merge bit at ENTRY_LOC_1 has been set to indicate requested information associated with spawned request A1 is to be returned with the requested information of the next spawned request A2. Note if the merge bit at ENTRY_LOC_0 were also set it would be an indication that the requested information of spawned requests A0 and A1 are to be returned with the requested information of spawned request A2.

Based on the state 500 of table 300 at FIG. 5, it can be determined that the first PCI-E read transaction has a size of 123 bytes and is fragmented into a spawned request A0 that requests one byte, a spawned request A1 that requests 2 bytes, and a spawned request A2 that requests 120 bytes, as indicated by the SIZE field at ENTRY_LOC_0-ENTRY_LOC_2.

Note that while the 123 bytes being requested are stored in contiguous address space relative to the requesting source, e.g., device 190, the 123 bytes need not be stored in contiguous address space relative to the device 105. For example, the 123 bytes can be stored at multiple memory locations at device 105, or accessible by device 105, that are not contiguously address mapped. The second PCI-E read transaction has a size of 512 bytes and is fragmented into a first spawned request B0 that requests 256 bytes, a second spawned request B1 that requests 256 bytes, as indicated by SIZE value at ENTRY_LOC_3 and ENTRY_LOC_4. Note that that from the 512 bytes being requested are stored in a contiguous address space relative to the device 105. In an embodiment, the first PCI-E read transaction is fragmented due to address-alignment restrictions at data processing device 105 and the second PCI-E read transaction is fragmented due to the size of the DATA bus of FIG. 1.

Figure 6:
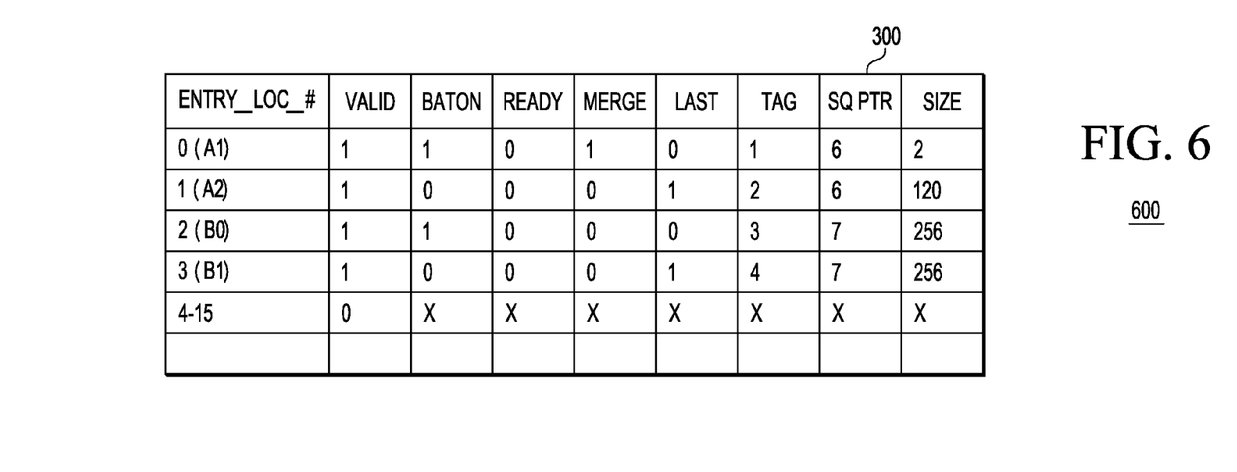

FIG. 6 illustrates a state 600 of table 300 following the receipt of information associated with spawned request A0 (state 415), which corresponds to ENTRY_LOC_0 at FIG. 5. The information received for request A0 is stored at OSRAM 170 (state 416). Because the baton bit is set and the merge bit is negated for spawned request A0, see ENTRY_LOC_0 at FIG. 5, the requesting source information returned by request A0 is provided to the requesting source from OSRAM 170 (state 435), the baton bit is passed to ENTRY_LOC_1 (state 436), and the status information associated with ENTRY_LOC_0 is de-allocated (state 435), which causes the table 300 to collapse, whereby status information for outstanding requests A1-A4 shifts up and becomes associated with ENTRY_LOC_0-ENTRY_LOC_3, respectively, as represented by state 600 of table 300 at FIG. 6.

Figure 7:
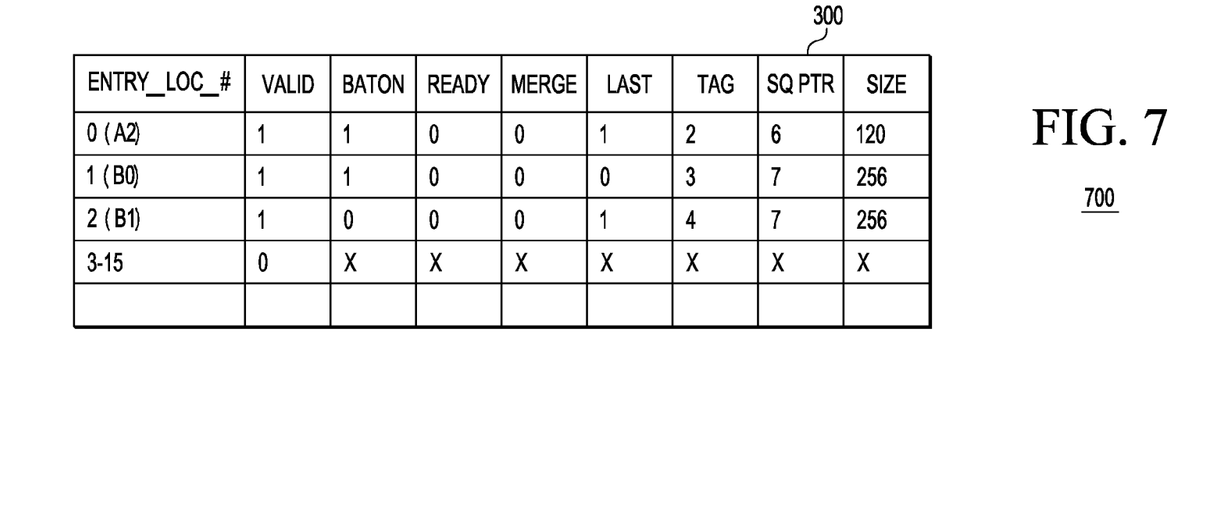

FIG. 7 illustrates a state 700 of table 300 following the receipt of information associated with spawned request A1 (state 415), which corresponds to entry location ENTRY_LOC_1. The information received for the requesting source by request A1 is stored at OSRAM 170 (state 416). Because both the baton bit and the merge bit are set for spawned request A0 (see ENTRY_LOC_0), the information received for request A1 is not returned to the requesting source device at this time, but instead is maintained at OSRAM 170 and will be returned with the information received for request A2, as described below. The entry associated with request A1 is de-allocated (state 430) since the received data is merged with request A2, and the baton is passed to the entry associated with request A2. Note that de-allocating request A1 causes the table to collapse as indicated at FIG. 7. Also note that the information for request A1 is stored at a location of OSRAM 170 based upon an offset value at table 300 (not shown) that is a subset of the information that is to be returned when the information associated with request A2 is received.

Figure 8:
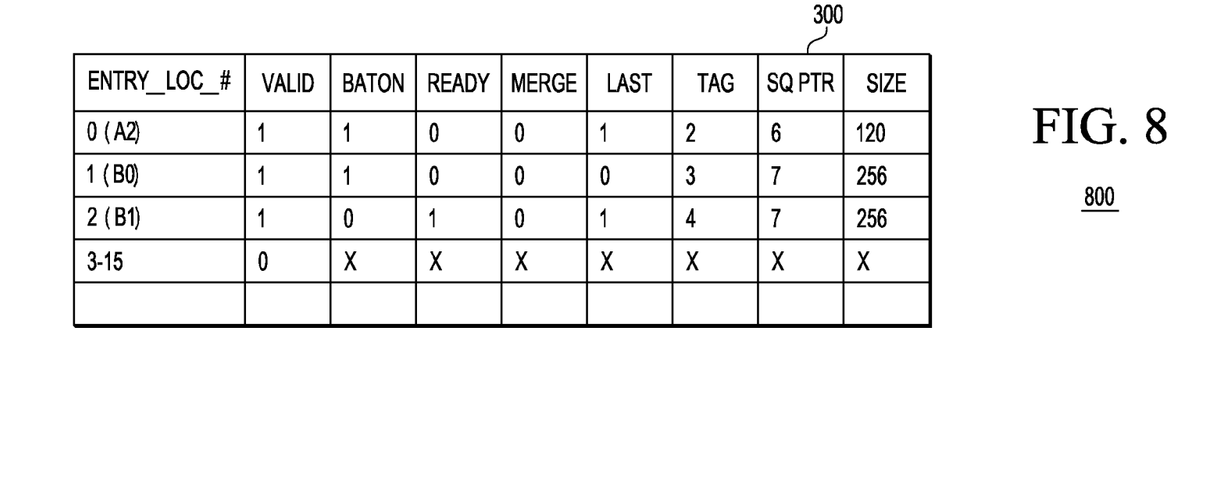

FIG. 8 illustrates a state 800 of table 300 following the receipt of information determined to be associated with spawned request B1 (state 415), which corresponds to entry location ENTRY_LOC_2 at FIG. 7. The information received for the requesting source by request B1 is stored at OSRAM 170 (state 416). Because the baton bit is negated and the merge bit is negated for request B1, the information received for request B1 is not returned to the requesting source device at this time and the ready bit for request B1 at ENTRY_LOC_2 is asserted (state 420).

Figure 9:
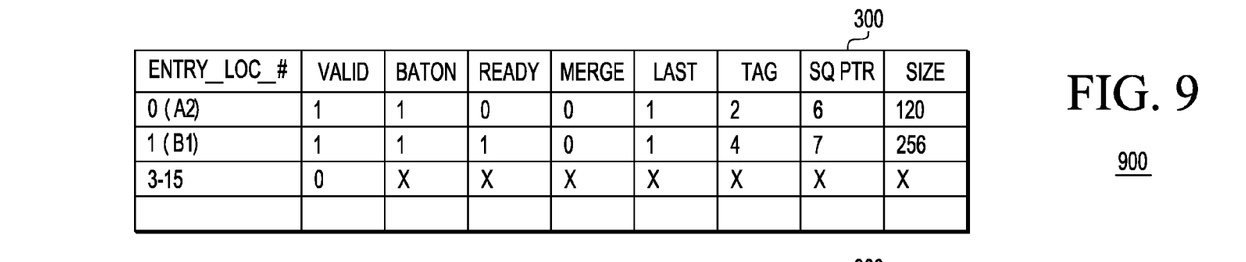
Figure 10:
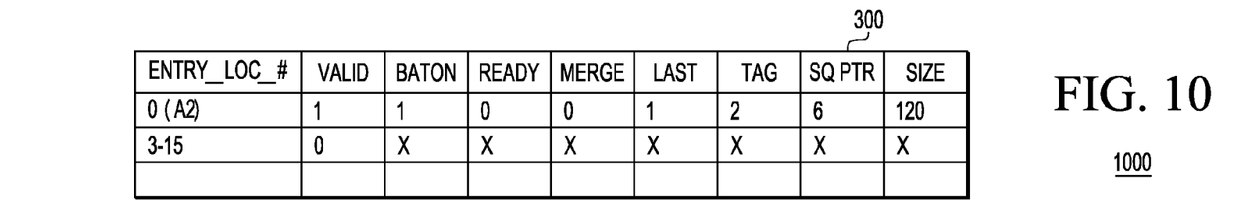

FIG. 9 illustrates a state 900 of table 300 following the receipt of information determined to be associated with spawned request B0 (state 415), which corresponds to entry location ENTRY_LOC_1 at FIG. 8. The information received for request B0 is stored at OSRAM 170 (state 416). Because the baton bit is asserted and the merge bit is negated for spawned request B0 (see ENTRY_LOC_1) at FIG. 8, the information received for request B0 is returned to the requesting source from OSRAM 170 (state 435), the baton bit is passed to ENTRY_LOC_1 (state 436), and the information associated with ENTRY_LOC_0 is de-allocated (state 435), which causes the table 300 to collapse as indicated at FIG. 9. Further processing continues (state 435 via state 437) because the baton was passed to an entry that has its ready bit asserted, thereby indicating the information for spawned request (B1) associated with this entry has already been received. Because the spawned request B1 is the last entry, and therefore cannot be further merged with any other entries, the information associated with B1 at OSRAM 170 is provided to the requesting source, and the information associated with ENTRY_LOC_1 is de-allocated (state 435). Note that the baton is not passed because all information associated with the source request has been returned to the source device. FIG. 10 illustrates a state 1000 of table 300 after the information associated with request B1 has been provided to the source device.

It will be appreciated, that when information for request A2 is received, it will be returned to the requesting source along with the previously merged information from request A1, and the information associated with ENTRY_LOC_0 will be de-allocated (state 435).

Figure 11:
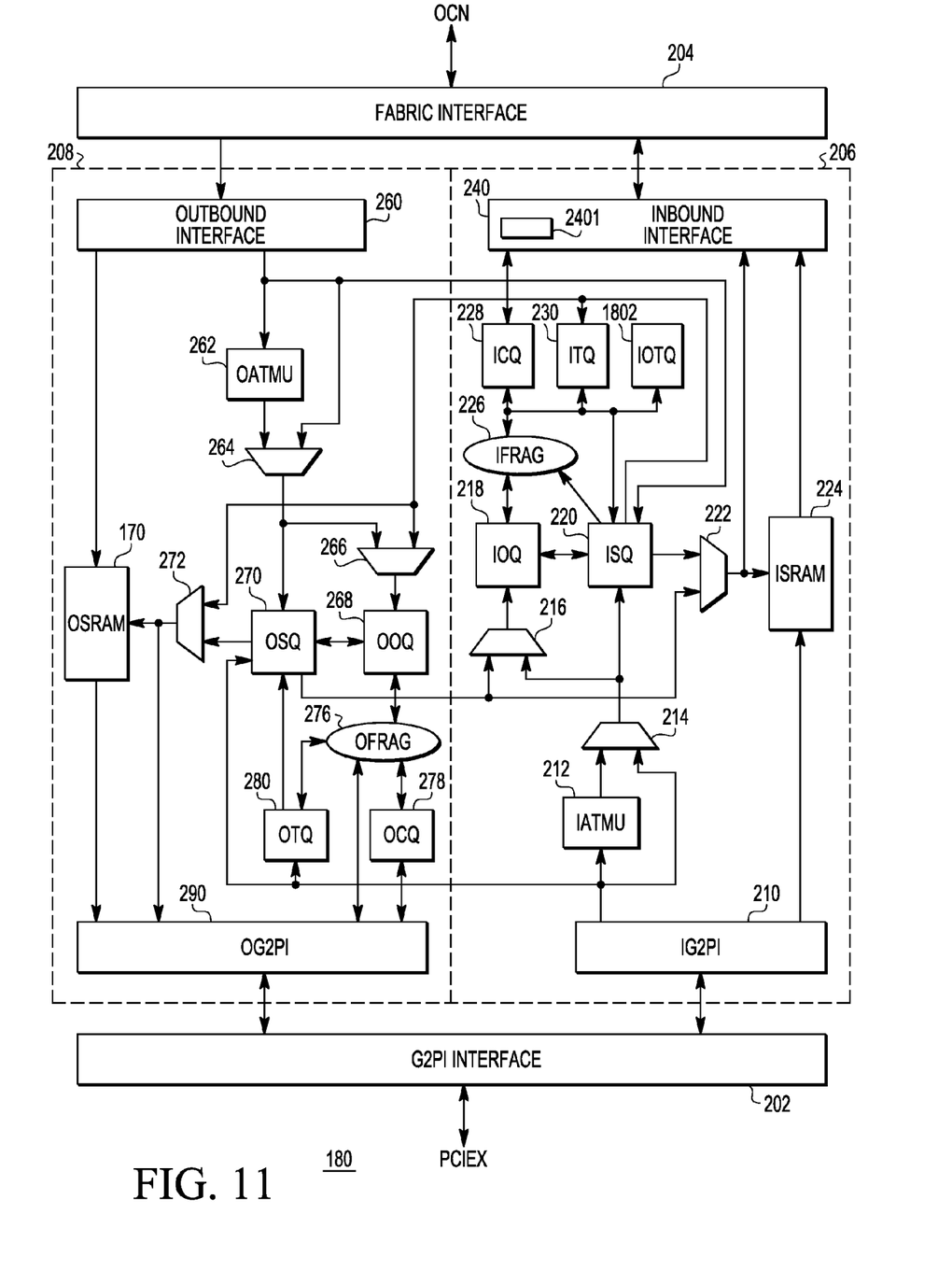
FIG. 11 is a block diagram illustrating the PCI-E controller of FIG. 1 in accordance with a specific embodiment of the present disclosure.

FIG. 11 is a block diagram illustrating PCI-E controller 180 of FIG. 1 in accordance with a specific embodiment of the present disclosure. PCI-E controller 180 includes a generic bus interface (G2PI) module 202, a fabric interface module 204, an inbound portion 206, and an outbound portion 208. Inbound portion 206 and outbound portion 208 are functionally similar to each other, with the exception that inbound portion 206 includes one additional module, IOTQ 1802. Inbound portion 206 receives read requests originating outside of data processing device 105 via bus PCIEX, and issues one or more local transactions at data processing device 105 via bus OCN. Responses to these requests are received from data processing device 105 via bus OCN and outbound portion 208 is configured to provide the requested information back to the originating external device via bus PCIEX.

Inbound portion 206 includes an inbound G2PI module (IG2PI) 210, an inbound address translation mapping unit (IATMU) 212, multiplexors 214, 216, and 222, an inbound ordered queue (IOQ) 218, an inbound static queue (ISQ) 220, an inbound static random access memory (ISRAM) 224, an inbound fragmentation (IFRAG) module 226, an inbound command queue (ICQ) 228, an inbound tag queue (ITQ) 230, an inbound ordered tag queue (IOTQ) 1802, and an inbound interface module 240.

Outbound portion 208 includes an outbound interface module 260, an outbound address translation mapping unit (OATMU) 262, multiplexors 264, 266, and 272, an outbound ordered queue (OOQ) 268, an outbound static queue (OSQ) 270, an outbound static random access memory (OSRAM) 170, an outbound fragmentation (OFRAG) module 276, an outbound command queue (OCQ) 278, an outbound tag queue (OTQ) 280, and an outbound G2PI module (OG2PI) 290.

G2PI module 202 is connected to IG2PI module 210, which together are configured to provide an interface between the PCIEX bus and logic blocks of inbound portion 206. IG2PI module 210 is connected to IATMU 212 and ISRAM 224. IATMU 212 is configured to receive requests from IG2PI module 210 to determine whether the address associated with the request corresponds to a memory-mapped module of data processing device 105, and if so, perform an address translation and provides the translated address to IOQ 218 via multiplexor 214 and 216, and to ISQ 220 via multiplexor 214.

ISRAM 224 is a three-kilobyte SRAM configured to store both write data and completion data. Write data is information that is provided by an external data processing device that is intended to be stored at a location that is accessible by data processing device 105. Completion data includes an acknowledgment provided by the target of a read or write transaction that the request has been fulfilled. For example, data processing device 105 can initiate a PCIE transaction to store information at an external data processing device, and ISRAM 224 can temporarily store completion information received (and acknowledgement) from the external data processing device indicating that the transaction was successfully completed. Completion data also includes information returned in response to a external read transaction. For example, data processing device 105 can initiate a PCI-E transaction to retrieve information that is stored at an external data processing device, and ISRAM 224 can temporarily store the requested information upon receipt at data processing device 105.

IOQ 218 is configured to hold transaction type attributes for all requests received from IG2PI module 210, and completions received from OSQ 270 via multiplexor 216. IOQ 218 is responsible for determining which transaction is the next to be sent to ICQ 228 and fabric interface module 204 via inbound interface module 240. IOQ 218 is a twenty-one entry queue and uses ISQ 220 and OSQ 270 pointers to link the transaction attribute with its ISQ/OSQ entry. ISQ 220 is a fourteen-entry queue configured to store the address and attributes associated with inbound requests received from IG2PI 210. The attributes are translated from PCI-E format to a format compatible with transmission over the bus OCN before they are stored in ISQ 220. ISQ 220 receives information from IOTQ 1802 before scheduling completions to be returned to OG2PI 290. Each request received from IG2PI module 210 occupies an entry at ISQ 220. The index of an entry at ISQ 220 serves as a static queue pointer used by other portions of PCI-E controller 180, including IOQ 218, ISRAM 224 (via multiplexor 222), IFRAG module 226, ICQ 228, ITQ 230, IOTQ 1802, and related blocks at outbound portion 208 including OOQ 268 via multiplexor 266 and OSRAM 170 via multiplexor 272.

IFRAG module 226 is configured to receive requests from IOQ 218, fragment the request into multiple spawned requests if required, dispatch the requests to ICQ 228, and stores the transaction type at ICQ 228 and IOTQ 1802. IFRAG module 226 also requests a tag from ITQ if needed to support non-posted transactions (transactions that require a response). ICQ 228 is configured to store a portion of the transaction attributes associated with each transaction sent from IFRAG module 226 to inbound interface module 240. Inbound interface module 240 includes a dispatch module 2401 that paces the rate at which requests are dispatched to bus OCN. ICQ 228 is an eight-entry queue that is indexed by OSQ 270 and ISQ 220 index pointers to link the transaction attribute with its corresponding OSQ/ISQ entry. A read or a write operation directed to a location accessible by crossbar switch 150 is initiated via inbound interface module 240. Once the read or write operation is successfully completed, the request is de-allocated in ICQ 228. ITQ 230 is a sixteen-entry queue configured to generate tags used for tracking inbound non-posted transactions (memory reads). ITQ 230 uses OSQ/ISQ index pointers to link the transaction tag with its OSQ/ISQ entry. ITQ 230 also monitors completions coming back from fabric interface module 204 via inbound interface module 240 and determines whether the completions are for valid outstanding inbound requests. This hit information is forwarded to ISQ 220 to complete the processing of outstanding requests.

IOTQ 1802 includes table 300, which is a sixteen-entry queue configured to store attributes that are used to keep track of outstanding read completions that are going to be returned from data processing device 105 via fabric interface module 204. Table 300 also stores the tags that are generated from ITQ 230 and a static queue pointer to associate an entry in ISQ 220 with a corresponding transaction. IOTQ 1802 schedules completions, which are returned via OG2PI module 290 by communicating with ISQ 220.

Inbound portion 206 is configured to accept a PCI-E read transaction at IG2PI module 210 from G2PI interface 202, and store a representation of the read transaction at ISQ 220 and IOQ 218. Read transactions provided by IG2PI module 210 are processed in the order that IOQ 218 receives them. As a read transaction reaches the top of IOQ 218, it is sent to IFRAG module 226, which determines a number of read requests needed to service the request. When more than one request is needed to process a single PCI-E read transaction, they are referred to as spawned requests. Each request issued by IFRAG module 226 (including spawned requests) requires a tag, which is generated and stored at ITQ 230 and IOTQ 1802. For each pending request IFRAG 226 reserves buffer space in OSRAM 170 for the pending completion data. The amount of buffer space reserved is either 128 bytes or 256 bytes depending on the size of the read request. A maximum of eight 128-byte buffer spaces are available (or four 256-byte buffer spaces) at OSRAM 170. IFRAG module 226 issues a request to inbound interface module 240 and at the same time stores the request at ICQ 228. Once IFRAG module 226 has finished providing the requests necessary to complete a transaction received from IG2PI 210, the entry at IOQ 218 corresponding to the completed transaction is removed, and its corresponding entry de-allocated. If the transaction requires spawning of multiple subordinate requests, IFRAG module 226 breaks the transaction into smaller sized requests, sends the requests to inbound interface module 240, and stores the request information at ICQ 228. Thus, a single read transaction incoming from PCI-E peripheral device 190 can result in multiple spawned requests issued to blocks at data processing device 105. Furthermore, multiple transactions received from PCI-E peripheral device 190 or other PCI-E peripheral devices connected via bus PCIEX can be processed by PCI-E controller 180. Inbound interface module 240 processes the request and sends the packet to crossbar switch 150 via fabric interface module 204, and the corresponding entry at ICQ 228 is de-allocated at this point.

In response to transaction from inbound interface module 240, fabric interface 204 will provide requests associated with the transaction to an appropriate portion of data processing device 105 requesting the desired information. As the desired information is returned to 204, it is provided to OSRAM 170 of outgoing module 208, ISQ 220 is updated to indicate receipt of the completion data, and ITQ 230 de-allocates the tag that was associated with the returned information, e.g., the completion data. In response to receiving the completion data, IOTQ 1802 determines whether to schedule a completion request at OOQ 268 by communicating with ISQ 220. OOQ 268 maintains ordering of requests and completions returned to the original requester via OG2PI 290. When the completion request transaction reaches the top of OOQ 268, it is forwarded to OCQ 278, and the corresponding entry at OOQ 268 is subsequently de-allocated. The reserved buffer space at OSRAM 170 is released and the associated entry at ISQ 220 is de-allocated. Completed transaction results are provided to PCI-E peripheral device 190 in address-increasing order as required by the PCI-E protocol.

Figure 12:
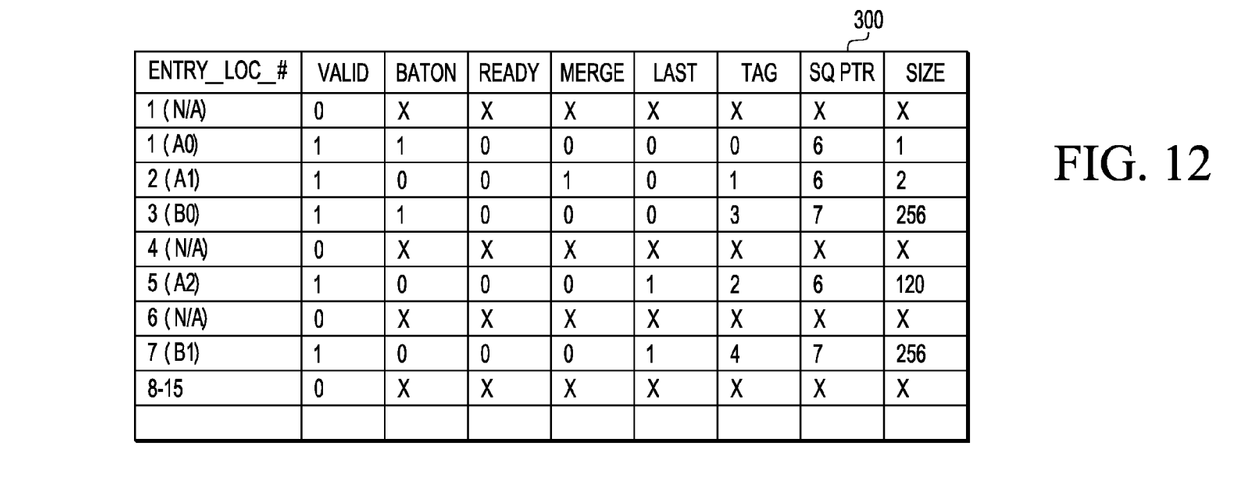
FIG. 12 illustrates a non-collapsible request table in accordance with a specific embodiment of the present disclosure.

An alternate embodiment of the present disclosure can be implemented without the use of an entry table that acts as a collapsible queue, so long as the sequence that spawned requests associated with a common source request are stored at the entry table is maintained. For example, FIG. 12 illustrates a request table containing the same state information for spawned requests A0-A2, B0, and B1 as the table of FIG. 5. However, because the table of FIG. 12 is not collapsible, the entry location corresponding to a spawned request will not change once it is allocated. As a result, there can be intervening entries between entries that correspond to a common source request. For example, ENTRY_LOC_4, which has not been allocated to a request, is between the entries corresponding to request B0 and B1, and between the entries corresponding to request A1 and A2. In addition, ENTRY_LOC_3, which is associated to request B0, is between the entries that correspond to request A1 and request A2. However, sequence module 93 associated with the IOTC 1082 can identify each entry associated with the same source request by parsing the table of FIG. 12 from top to bottom to identify the next record with the same SQ PTR. Therefore, it is not necessary that spawned requests associated with a common source request be stored contiguously, as illustrated at FIG. 6, so long as they are sequential. In such an embodiment, the use of a collapsible queue is not needed as it is the relative location of two records with respect to each other that is indicative of an order that their associated information is to be returned. In a similar manner, storage of the baton bit at the table of FIG. 12 can be avoided by having the sequence module 93 determine the top-most entry for a plurality of spawned requests based upon the SQ PTR.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, techniques disclosed herein are applicable to other internal and peripheral interface modules in addition to their use at a PCI-E peripheral device, e.g. SRIO controller 170. Wherein the disclosed techniques have been described with regard to a PCI-E read transaction initiated by PCI-E peripheral device 190, it will be appreciated that these techniques can also be applied in other situations. For example, these techniques can be used to provide transaction confirmation information during a non-posted PCI-E write transaction initiated by PCI-E peripheral device 190. Whereas a single PCI-E controller 180 is illustrated at data processing device 105, data processing device 105 can include more than one PCI-E controller, each PCI-E controller having a dedicated interface bus. The PCI-E standard supports two, four, eight, sixteen, or thirty-two lanes and the techniques disclosed herein support any number of lanes.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
receiving, at an integrated circuit device, a first request identifying a contiguous address space storing first information to be returned to a requesting device, the contiguous address space beginning at a first address;
generating by the integrated circuit device a first plurality of spawned requests for information, the first plurality of spawned requests associated with the first request, each spawned request of the first plurality of spawned requests corresponding to a respective portion of the first information, the first plurality of requests including a first spawned request and a second spawned request, the first spawned request corresponding to a first portion of the first information that includes information at the first address, and the second spawned request corresponding to a second portion of the first information, the first portion and the second portion associated with contiguous addresses of the contiguous address space;
for each spawned request associated with the first request, allocating a respective record of a table, the record including a first field;
asserting an indicator at the first field of a first record associated with the first spawned request to indicate that the first portion of the first information is to be returned to the requesting device prior to any other portion of the first information; and
negating an indicator at the first field of the record associated with the second spawned request to indicate that the second portion of the first information is to be returned to the requesting device subsequent to at least one other portion of the first information.

2. The method of claim 1 wherein generating the first plurality of spawned requests comprises providing the second spawned request subsequent to providing the first spawned request, and prior to receiving the first portion of the first information.

3. The method of claim 1 wherein generating the first plurality of spawned requests comprises providing the first spawned request subsequent to providing the second spawned request, and prior to receiving the second portion of the first information.

4. The method of claim 1 further comprising:
storing the second portion of the first information at the integrated circuit device in response to receiving the second portion of the first information;
not providing the second portion of the first information to the requesting device in response to determining that the indicator at the first field of the record associated with the second spawned request is negated.

5. The method of claim 4 further comprising:
subsequent to not providing the second portion of the first information, asserting the indicator at the first field of the record associated with the second spawned request in response to the first portion of the first information being returned to the requesting device; and
providing the second portion of the first information to the requesting device in response to determining that the indicator at the first field of the record associated with the second spawned request is asserted.

6. The method of claim 1 further comprising:
storing the first portion of the first information at the integrated circuit device in response to receiving the first portion of the first information;
providing the first portion of the first information stored at the integrated circuit device to the requesting device in response to determining that the indicator at the first field of the record associated with the second spawned request is asserted.

7. The method of claim 6 further comprising:
de-allocating the record associated with the first spawned request in response to providing the first portion of the first information to the requesting device.

8. The method of claim 7 further comprising:
asserting an indicator at the first field of the record associated with the second spawned request, in response to providing the first portion, to indicate that the second portion of the first information is to be returned to the requesting device prior to any other pending spawned request of the first plurality of spawned requests.

9. The method of claim 1 wherein:
generating the first plurality of spawned requests further comprises providing the first plurality of spawned requests in any order.

10. The method of claim 1, wherein allocating the respective records further comprises the respective records being contiguous records, including a first record contiguous to a second record, the first record associated with the first spawned request, and the second record associated with the second spawned request.

11. The method of claim 1, wherein allocating the respective records further comprises the respective records being sequential records relative to a specific record, including a first record contiguous to a second record, the first record associated with the first spawned request, and the second record associated with the second spawned request.

12. The method of claim 1 further comprising:
receiving a request for second information from a second requesting device, the second information stored at contiguous address locations beginning at a second address;
determining that a portion of the second information has been received prior to receiving the first portion of the first information; and
providing the portion of the second information to the requesting device.

13. A device comprising:
a pending request table comprising a plurality of contiguous entry locations, including a first entry location and a second entry location, the first entry location representing a top entry, the second entry location being contiguous to the first entry;
a fragmentation module to generate a plurality of spawned requests based upon a source request to access a first set of storage locations; and
an allocation module to allocate a plurality of sequential locations of the pending request table to the plurality of spawned requests, each sequential location corresponding to a respective spawned request, the relative location of each sequential location to each other sequential location of the plurality of sequential locations indicative of an order that information requested by each spawned request is to be returned relative to each other spawned request of the plurality of spawned requests.

14. The device of claim 13, wherein the plurality of sequential locations are contiguous locations.

15. The device of claim 13 further comprising:
a dispatch module to dispatch the plurality of spawned requests, the dispatch of each spawned request is independent of completion of any other spawned request.

16. The device of claim 13, wherein each entry location of the pending request table comprises a first field, and further comprising:

a status module to assert an indicator at the first field of a first entry location of the plurality of contiguous entry location in response to a spawned request associated with the first entry location being associated with information to be returned to a requesting device before information from any other spawned request.

17. The device of claim 16, wherein the status module is further to negate the indicator at the first field of the first entry location in response to a different spawned request associated with a different entry location being associated with information prior to the spawned request associated with the first entry location.

18. The device of claim 13 further comprising:

a completion module to determine based upon relative locations of the plurality of sequential locations whether information that has been received in response to the first request of the plurality of spawned requests is to be returned to a requesting device.

19. A method comprising:

receiving, at an integrated circuit device, a first request identifying a contiguous address space storing first information to be returned to a requesting device, the contiguous address space beginning at a first address;

generating by the integrated circuit a first plurality of spawned requests for information, the first plurality of spawned requests associated with the first request, each spawned request of the first plurality of spawned requests corresponding to a respective portion of the first information, the first plurality of spawned requests including a first spawned request and a second spawned request, the first spawned request corresponding to a first portion of the first information that includes information at the first address, and the second spawned request corresponding to a second portion of the first information, the first portion and the second portion associated with contiguous addresses of the contiguous address space;

allocating a first record of a pending request table with the first spawned request and a second record of the pending request table with the second spawned request, wherein the location of the first record relative to the location of the second record is indicative of an order that the first portion of the first information is to be returned relative to the second portion of the first information.

20. The method of claim 19 wherein the first record is not contiguous with the second record.

* * * * *